US011232602B2

(12) United States Patent
Chen et al.

(10) Patent No.: US 11,232,602 B2
(45) Date of Patent: Jan. 25, 2022

(54) IMAGE PROCESSING METHOD AND COMPUTING DEVICE FOR AUGMENTED REALITY DEVICE, AUGMENTED REALITY SYSTEM, AUGMENTED REALITY DEVICE AS WELL AS COMPUTER-READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lili Chen, Beijing (CN); Hao Zhang, Beijing (CN); Ming Chen, Beijing (CN); Xue Dong, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/745,412

(22) Filed: Jan. 17, 2020

(65) Prior Publication Data
US 2020/0234470 A1 Jul. 23, 2020

(30) Foreign Application Priority Data
Jan. 22, 2019 (CN) .......................... 201910058904.2

(51) Int. Cl.
G06T 11/00 (2006.01)
G09G 5/38 (2006.01)
G09G 5/02 (2006.01)

(52) U.S. Cl.
CPC ................ *G06T 11/00* (2013.01); *G09G 5/02* (2013.01); *G09G 5/38* (2013.01);
(Continued)

(58) Field of Classification Search
None
See application file for complete search history.

(56) References Cited

U.S. PATENT DOCUMENTS

2011/0140994 A1* 6/2011 Noma ................... G02B 27/017
345/8
2014/0146394 A1* 5/2014 Tout ..................... G02B 27/017
359/630
(Continued)

FOREIGN PATENT DOCUMENTS

CN 103873840 A 6/2014
CN 106203289 A 12/2016
(Continued)

OTHER PUBLICATIONS

First Office Action for Chinese Patent Application No. 201910058904.2 dated Apr. 1, 2020.
(Continued)

*Primary Examiner* — Yi Wang
(74) *Attorney, Agent, or Firm* — Calfee Halter & Griswold LLP

(57) ABSTRACT

An image processing method for an augmented reality device, a system which implements the device, and a computer readable storage medium storing the steps of the processing method. The method includes the steps of: generating an additional image according to a target object within a user's field of vision, wherein the resolution of the additional image is smaller than the resolution of a display area in the display screen of the augmented reality device; determining the position information of the additional image with respect to the display area, the position information defining a target area for displaying the additional image in the display area; outputting the additional image and the position information to the display screen; and displaying
(Continued)

the additional image in the target area to generate a display image.

20 Claims, 7 Drawing Sheets

(52) U.S. Cl.
CPC ............ *G09G 2320/0686* (2013.01); *G09G 2340/0407* (2013.01); *G09G 2340/0464* (2013.01); *G09G 2340/12* (2013.01)

(56) References Cited

U.S. PATENT DOCUMENTS

| | | | |
|---|---|---|---|
| 2014/0160163 | A1 | 6/2014 | Zhang et al. |
| 2016/0019830 | A1* | 1/2016 | Schlangen ............ G09F 19/12 345/82 |
| 2016/0378177 | A1 | 12/2016 | Wei |
| 2018/0365906 | A1* | 12/2018 | Miller ................ G06F 3/04845 |
| 2019/0235817 | A1 | 8/2019 | Dai et al. |

FOREIGN PATENT DOCUMENTS

| | | |
|---|---|---|
| CN | 106959759 A | 7/2017 |
| CN | 107333119 | 11/2017 |
| CN | 107765842 A | 3/2018 |

OTHER PUBLICATIONS

Office Action from Chinese Application No. 201910058904.2 dated May 14, 2021.

\* cited by examiner

IMAGE PROCESSING METHOD AND COMPUTING DEVICE FOR AUGMENTED REALITY DEVICE, AUGMENTED REALITY SYSTEM, AUGMENTED REALITY DEVICE AS WELL AS COMPUTER-READABLE STORAGE MEDIUM

CROSS-REFERENCE TO RELATED APPLICATIONS

The present application claims the benefit of Chinese Patent Application No. 201910058904.2, filed on Jan. 22, 2019 with the China National Intellectual Property Administration, the entire disclosure of which is incorporated herein by reference.

TECHNICAL FIELD

The present disclosure relates to the field of augmented reality technology, and more particularly to an image processing method and a computing device for an augmented reality device, an augmented reality system, an augmented reality device, as well as a computer-readable storage medium.

BACKGROUND

Augmented reality (AR) technology is a kind of technology that acquires real environment information by a camera, then superimposes a virtual object (such as an image, a scene or system prompt information) into the acquired real environment information, and then displays them to the user together, so as to realize the visual effect that the user can sensorily see the virtual object simultaneously existing in the real environment, that is to say, to realize the "augmentation" of the real scene.

Generally, the process of augmented reality comprises: a camera acquiring the image of the real scene, a processor generating a whole image for projection based on the image and transmitting the whole image to a micro display screen, the whole image being processed through an optical system and then being projected into the user's field of vision so as to be superimposed with the real scene.

However, only part of the whole image generated and transmitted by the processor is usually the area (also known as an additional image) associated with the target object in the real scene, and the area other than the additional image is the background. Therefore, in the process of transmission and display, the transmission and display of the whole image leads to a large amount of data processing and transmission, which increases the data transmission bandwidth demand and display power consumption, which affects the display quality of an AR display system.

SUMMARY

According to an exemplary embodiment, there is provided an image processing method for an augmented reality device, which comprises the steps of: generating an additional image according to a target object within a user's field of vision, wherein the resolution of the additional image is smaller than the resolution of a display area in the display screen of the augmented reality device; determining the position information of the additional image with respect to the display area, the position information defining a target area for displaying the additional image in the display area; outputting the additional image and the position information to the display screen; and displaying the additional image in the target area to generate a display image.

In some exemplary embodiments, the step of generating an additional image according to a target object within a user's field of vision comprises: acquiring an image of the target object; comparing the image of the target object with a pre-stored feature image to identify the target object; and generating the additional image according to the result of the identification.

In some exemplary embodiments, there is a further step of determining the target object within the user's field of vision.

In some exemplary embodiments, the step of determining the target object within the user's field of vision comprises: tracking an eyeball movement of the user to determine the target object.

In some exemplary embodiments, there is a further step of turning off an area other than the target area within the display area of the display screen.

In some exemplary embodiments, there is a further step of displaying in a solid color in the area other than the target area within the display area of the display screen so that the display image comprises a background in the solid color.

In some exemplary embodiments, the additional image is displayed at a first refresh frequency in the target area, and the background in the solid color is displayed at a second refresh frequency less than the first refresh frequency in the area other than the target area within the display area of the display screen.

In some exemplary embodiments, the first refresh frequency is greater than or equal to 60 Hz, and the second refresh frequency is less than or equal to 1 Hz.

According to another exemplary embodiment, there is provided a computing device for an augmented reality device, comprising: an additional image generation module configured to generate an additional image according to a target object within a user's field of vision, wherein the resolution of the additional image is smaller than the resolution of a display area in the display screen of the augmented reality device; a position determination module configured to determine the position information of the additional image with respect to the display area, the position information defining a target area for displaying the additional image in the display area; a transmission module configured to output the additional image and the position information to the display screen; and a display image generation module configured to display the additional image in the target area to generate a display image.

In some exemplary embodiments, the additional image generation module is configured to acquire an image of the target object, compare the image of the target object with a pre-stored feature image to identify the target object, and generate the additional image according to the result of the identification.

In some exemplary embodiments, there is further a target object determination module configured to determine the target object within the user's field of vision.

In some exemplary embodiments, the target object determination module is further configured to track an eyeball movement of the user to determine the target object.

In some exemplary embodiments, the display image generation module is further configured to turn off an area other than the target area within the display area of the display screen.

In some exemplary embodiments, the display image generation module is further configured to display in a solid color in the area other than the target area within the display area of the display screen so that the display image comprises a background in the solid color.

In some exemplary embodiments, the display image generation module is further configured to display the additional image at a first refresh frequency in the target area, and display the background in the solid color at a second refresh frequency less than the first refresh frequency in the area other than the target area within the display area of the display screen.

According to another exemplary embodiment, there is provided an augmented reality system comprising an augmented reality device, and a computing device as stated above.

In some exemplary embodiments, the computing device further comprises a target object determination module configured to determine the target object within the user's field of vision.

According to a yet another exemplary embodiment, there is provided an augmented reality device comprising a memory configured to store a computer program; and a processor configured to execute the computer program to implement the image processing method as stated above.

In some exemplary embodiments, the augmented reality device is augmented reality glasses.

According to another exemplary embodiment, there is provided a computer-readable storage medium in which a computer program is stored. When executed, the computer program implements the image processing method as stated above.

BRIEF DESCRIPTION OF THE DRAWINGS

For explaining the technical solutions of the exemplary embodiments of the present disclosure more clearly, drawings necessary for describing the exemplary embodiments of the present disclosure will be briefly introduced hereinafter. It shall be noted that the following drawings are only related to some exemplary embodiments of the present disclosure. As far as those skilled in the art are concerned, other drawings can be obtained from these drawings without making inventive labor, wherein.

Figure 1:
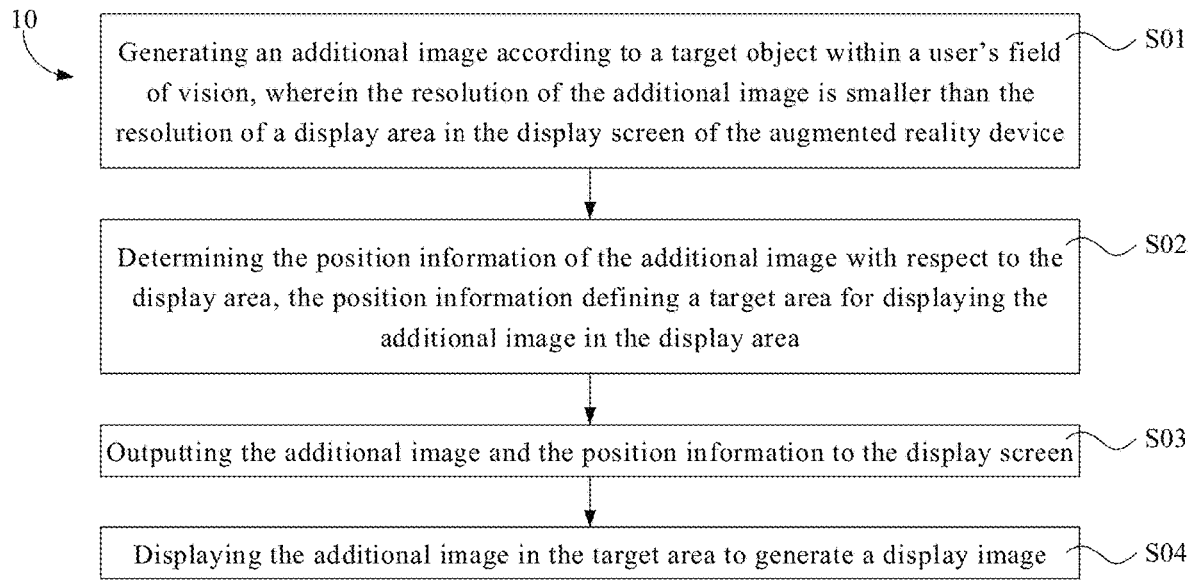
FIG. 1 is a schematic flowchart of an image processing method for an augmented reality device provided by an exemplary embodiment.

It shall be understood that the drawings in the present disclosure are merely used to illustrate the principles of the technical solutions of the exemplary embodiments of the present disclosure, so the drawings are not necessarily drawn to scale. Moreover, identical elements, components or parts are indicated by the same reference numerals throughout the drawings.

DETAILED DESCRIPTION

In the following, the technical solutions in exemplary embodiments will be described clearly and completely in connection with the drawings. It shall be noted that the described exemplary embodiments are only part of the embodiments, and not all of the embodiments. Based on the exemplary embodiments in the present disclosure, all other embodiments obtained by those of ordinary skills in the art under the premise of not paying out creative work fall within the protection scope of the present disclosure.

In the following, the terms such as "first", "second" and the like can be used for descriptive purposes only, rather than be understood as disclosing or implying relative importance, or implicitly indicating the number of technical features referred to. Thus, a feature defined by "first" or "second" may explicitly or implicitly include one or more such features. In addition, it should be noted that these terms are only used to distinguish one element, component or part from another. Therefore, the first element, component or part discussed below may also be referred to as the second or third element, component or part without departing from the teachings of the present disclosure. In the description of the exemplary embodiments of the present disclosure, unless otherwise specified, "multiple" or "plurality of" means two or more.

It shall be noted that, unless otherwise defined, all terms (including technical terms and scientific terms) used in the exemplary embodiments of the present disclosure have the same meaning as commonly understood by one having ordinary skills in the art to which the disclosure belongs. It should also be understood that terms such as those defined in a common dictionary should be construed as having the same meaning as in the context of the related art, and will not be construed in an ideal or overly formal sense, unless defined explicitly as such herein.

For instance, the terms of "comprise" and/or "include" used in the Description and Claims of the present disclosure indicate that the features, entireties, steps, operations, elements and/or components appearing before said terms cover the features, entireties, steps, operations, elements and/or components enumerated thereafter, but do not exclude the presence of one or more other features, entireties, steps, operations, elements, components and/or groups thereof.

It should be noted that the steps involved in the method described in the present disclosure are exemplary, and are not necessarily to be implemented in the order as listed. Instead, one or more of these steps may be implemented in a different order or simultaneously according to actual situations. Furthermore, the described method may also comprise other additional steps according to actual situations.

In addition, the terms of locality used in the description of the present disclosure, such as "up", "down", "left", "right" or the like, are all descriptions for the figures in the drawings of the present disclosure, which are not restrictive. Therefore, it should be understood that when in actual use, the description of locality in the present disclosure should be changed accordingly due to the change of locality.

Some techniques, structures and materials commonly known in the art of this disclosure to which the disclosure belongs are not described in detail for the sake of clarity so as to avoid making the present application tediously long.

In related technologies, when a conventional AR device is used for display, the processor of the AR device (i.e. Adjunct Processor, briefly known as AP) generates a whole image to be projected into a user's field of vision, wherein the background part needs to be processed into a solid color (for example, black), and then superimposed with an additional image to provide the content of interest associated with a target object in the real scene; then, the whole image is transmitted fully by the processor of the AR device to a micro display screen of the AR device for display, and then the whole image displayed on the micro display screen is projected in front of the user's eyes through the optical system of the AR device (including optical elements such as optical reflection element(s) and an imaging lens(es)). In a virtual image formed by projection, when the background part of the whole image is in black, the background part is projected to be a transparent part; when the background part is in other solid color, the background part is projected to be a partially transparent part, so that people can observe the contents in the real world. In the whole projected image, the contents in the region of interest formed by the additional image is normally projected into the field of vision of the human eyes for the sake of a normal display in the field of vision of the human eyes.

Although the region of interest associated with the target object in the real scene is only a small part of the whole image (correspondingly, occupying only a small part of the display area of the whole micro display screen), the processor (AP) will still output the whole image to the micro display screen, that is, process with the resolution of the whole display area of the micro display screen, thereby increasing the data transmission bandwidth demand and display power consumption.

As a non-limiting example, when the display area of the micro display screen has a high resolution (for example, 8K, i.e., 7680×4320 pixels) and a large field of view, the background part will occupy a large proportion of the data to be processed by the processor, thereby resulting in a large amount of redundancy in data transmission, and affecting the display effect.

With reference to FIG. 1, it is a schematic flowchart of an image processing method for an AR device provided by an exemplary embodiment of the present disclosure. As shown in FIG. 1, the image processing method 10 for the AR device comprises the steps of:

S01: generating an additional image according to a target object within a user's field of vision, wherein the resolution of the additional image is smaller than the resolution of a display area in the display screen of the augmented reality device;

S02: determining the position information of the additional image with respect to the display area, the position information defining a target area for displaying the additional image in the display area;

S03: outputting the additional image and the position information to the display screen; and S04: displaying the additional image in the target area to generate a display image.

In the step S01, the contents of the generated additional image are associated with the target object. For instance, the contents of the additional image may be explanatory information describing the target object, or additional information or derivative information related to the target object.

As a non-limiting example, when the target object within the user's field of vision is the Eiffel Tower, the content of the additional image may be the three words "The Eiffel Tower" to describe and explain the target object (i.e. Eiffel Tower). In addition, the content of the above additional image may also be additional information such as the height of the Eiffel Tower, the information of the designer, the time of completion. Moreover, the content of the above additional image may also be the French national flag, that is, the information of the French national flag derived from the target object Eiffel Tower.

It should be understood that since the resolution of the additional image is less than that of the display area of the display screen of the AR device, the amount of redundant data processed by the processor of the AR device is reduced when generating and then transmitting the additional image.

In step S02, the position information of the additional image with respect to the display area of the display screen of the AR device may be determined based on the resolution of the display area of the display screen. As a non-limiting example, the position information may comprise the coordinates of the reference point in the additional image in the display area of the display screen and the rotation angle of the additional image with respect to the display area of the display screen. Based on the coordinates of the reference point of the additional image in the display area and the rotation angle of the additional image with respect to the display area, together with the resolution of the additional image itself, the target area corresponding to the additional image may be defined in the display area of the display screen. The target area may be used to display the additional image, as described below.

Figure 2:
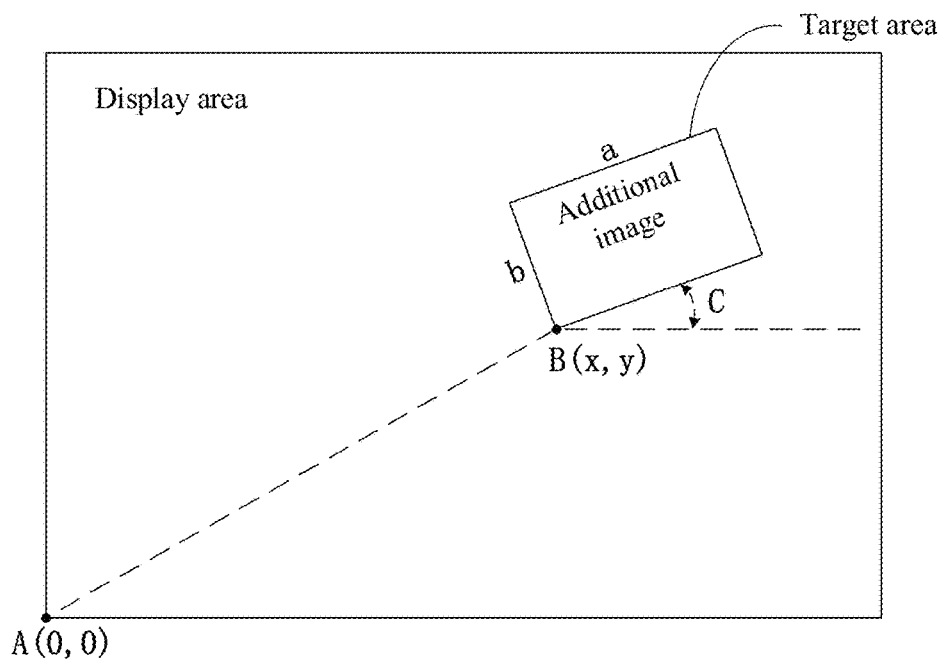
FIG. 2 schematically shows an example of determining the position information of an addition image with respect to the display area of a display screen in the image processing method as shown in FIG. 1.

FIG. 2 schematically shows an example of determining the position information of an addition image with respect to the display area of the display screen. As shown in FIG. 2, the reference point in the display area of the display screen may be selected to be the point A in the lower left corner thereof, the coordinates of which may be defined as (0, 0), and the reference point of the additional image may also be selected to be the point B in the lower left corner thereof. It is easy to understand that for the display area of the display screen and the additional image, selecting the point in the lower left corner thereof as the reference point is only exemplary and any other suitable points in the display area of the display screen and the additional image may also be selected as reference points, which will not be specially defined in the present disclosure. As shown in FIG. 2, the coordinates of the point B in the display area of the display screen may be (x, y), and the coordinates (x, y) may be directly designated by the processor, or determined by the processor according to the approximate position of the target object in the user's field of vision, which will not be specially defined in the present disclosure. FIG. 2 shows the rotation angle C of the additional image with respect to the display area of the display screen. The rotation angle C may be 0° or any other suitable angle, which will not be specially defined in the present disclosure. The resolution of the additional image is a×b. With the determined coordinates (x, y) and rotation angle C, and in combination with the resolution a×b of the additional image, the target area for displaying the additional image in the display area of the display screen may be defined. It should be noted that position information in other form is also possible, as long as it can help define the target area for displaying the additional image in the display area of the display screen, which will not be specially defined in the present disclosure.

In the step S03, the additional image and position information are outputted to the display screen. Outputting the additional image comprises outputting image information of the image, which may be, as a non-limiting example, RGB data information of the image. Outputting the position information to the display screen comprises, for example, outputting the coordinates of the reference point in the additional image and the rotation angle of the additional image with respect to the display area of the display screen. In addition, the additional image and position information may be outputted through any suitable transmission interface. For example, without limitation, through a high definition multimedia interface (HDMI).

In the step S04, the display screen displays the additional image in the determined target area in order to generate a display image. The display image may then be projected into the user's field of vision through the optical system of the AR device, so as to be superimposed with the real scene, thereby "augmenting" the real scene.

In the image processing method as shown in FIG. 1, since the resolution of the additional image generated by the processor is smaller than that of the display area of the display screen, and the processor only outputs the additional image and position information to the display screen, the amount of data processed by the processor and the amount of data outputted by the processor to the display screen can be greatly reduced, thereby significantly decreasing the transmission bandwidth demand and display power consumption. Therefore, the AR device adopting the image processing method as shown in FIG. 1 is more suitable for high-end display application with ultra-high resolution (i.e., pixels per inch, (PPI)) and/or a large field of view (FOV).

In other exemplary embodiments of the present disclosure, when generating an additional image in the step S01, the processor may also generate a solid color background part with the same resolution as that of the display area of the display screen. This may be helpful for determining the position information of the additional image with respect to the display area of the display screen. However, in the subsequent step S03, only the additional image and position information, rather than the data related to the background part, are transmitted, thereby reducing the amount of data outputted by the processor to the display screen, so as to decrease the transmission bandwidth demand and display power consumption.

Figure 3:
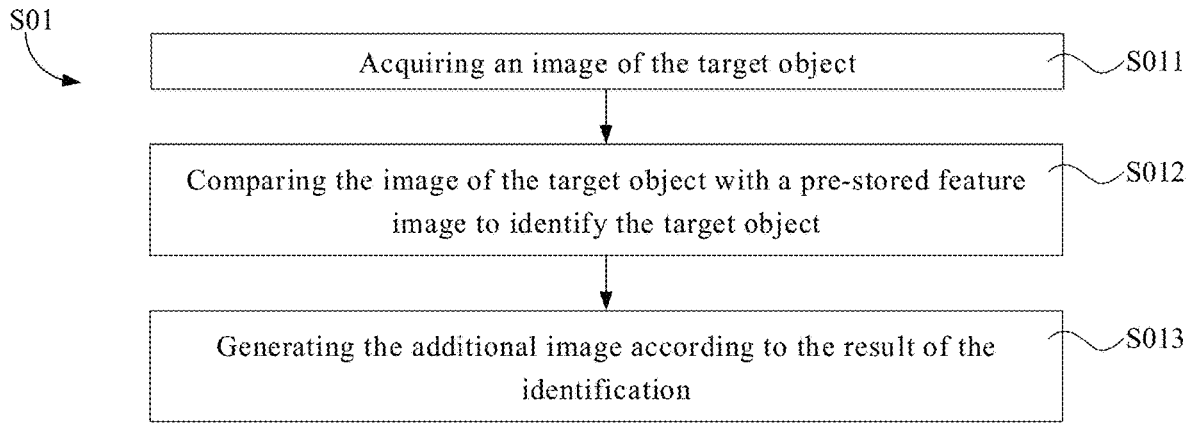
FIG. 3 schematically shows an example of generating an additional image according to a target object within a user's field of vision in the image processing method as shown in FIG. 1.

FIG. 3 schematically shows an example of generating an additional image according to a target object within a user's field of vision in the image processing method as shown in FIG. 1. As shown in FIG. 3, step S01 for generating an additional image in the image processing method as shown in FIG. 1 may comprise the steps of:

S011: acquiring an image of the target object;
S012: comparing the image of the target object with a pre-stored feature image to identify the target object; and
S013: generating the additional image according to the result of the identification.

In step S011, as a non-limiting example, the image of the target object may be acquired based on an image taken by the AR device and related to the user's field of vision. It should be understood that any suitable image acquisition method is possible, which will not be specially defined in the present disclosure. In step S012, the pre-stored feature image may be stored in a pre-established database related to the feature image. The database may be local (for example, in the memory of the AR device itself) or remote (for example, in the remote server), which will not be specially defined in the present disclosure. In addition, the method for image identification may be any suitable image identification method, which will not be specially defined in the present disclosure. In step S013, the desired additional image is generated based on the result of identification, and for example, in combination with the explanatory information describing the target object, or the additional information or derivative information related to the target object as stated above.

Figure 4:
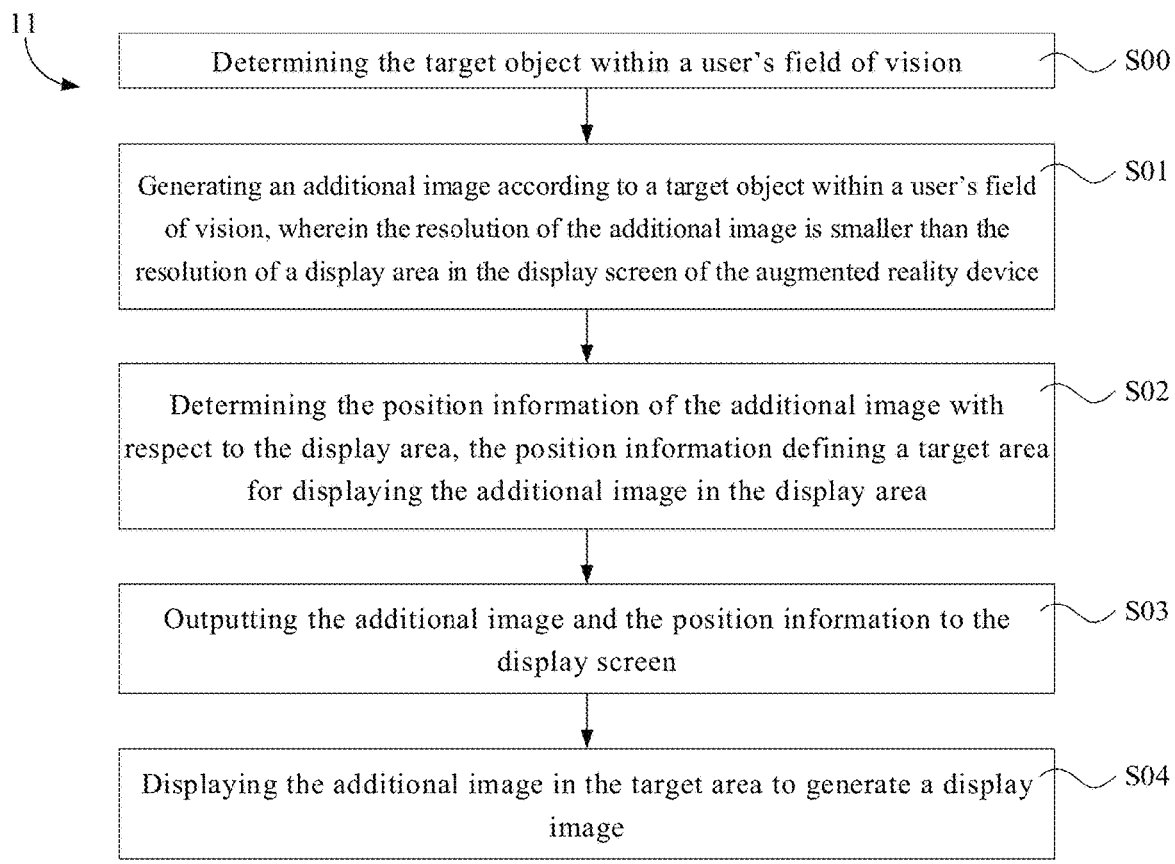
FIG. 4 is a schematic flowchart of an image processing method for an augmented reality device provided by an exemplary embodiment.

With reference to FIG. 4, it is a schematic flowchart of an image processing method for an AR device provided by another exemplary embodiment of the present disclosure. As shown in FIG. 4, the image processing method 11 only differs from the image processing method 10 as shown in FIG. 1 in that it further comprises the step S00 of determining the target object within a user's field of vision.

As a non-limiting example, an object substantially in the center of the user's field of vision may be determined as a target object. Alternatively, in the case where the AR device may comprise an eyeball tracking apparatus, or in the case where data may be received from an additional eyeball tracking apparatus, the user's eye movement may also be tracked to determine the target object within the user's field of vision. It should be understood that any other suitable method may also be used in the step S00 to determine the target object within the user's field of vision, which will not be specially defined in the present disclosure.

Figure 5:
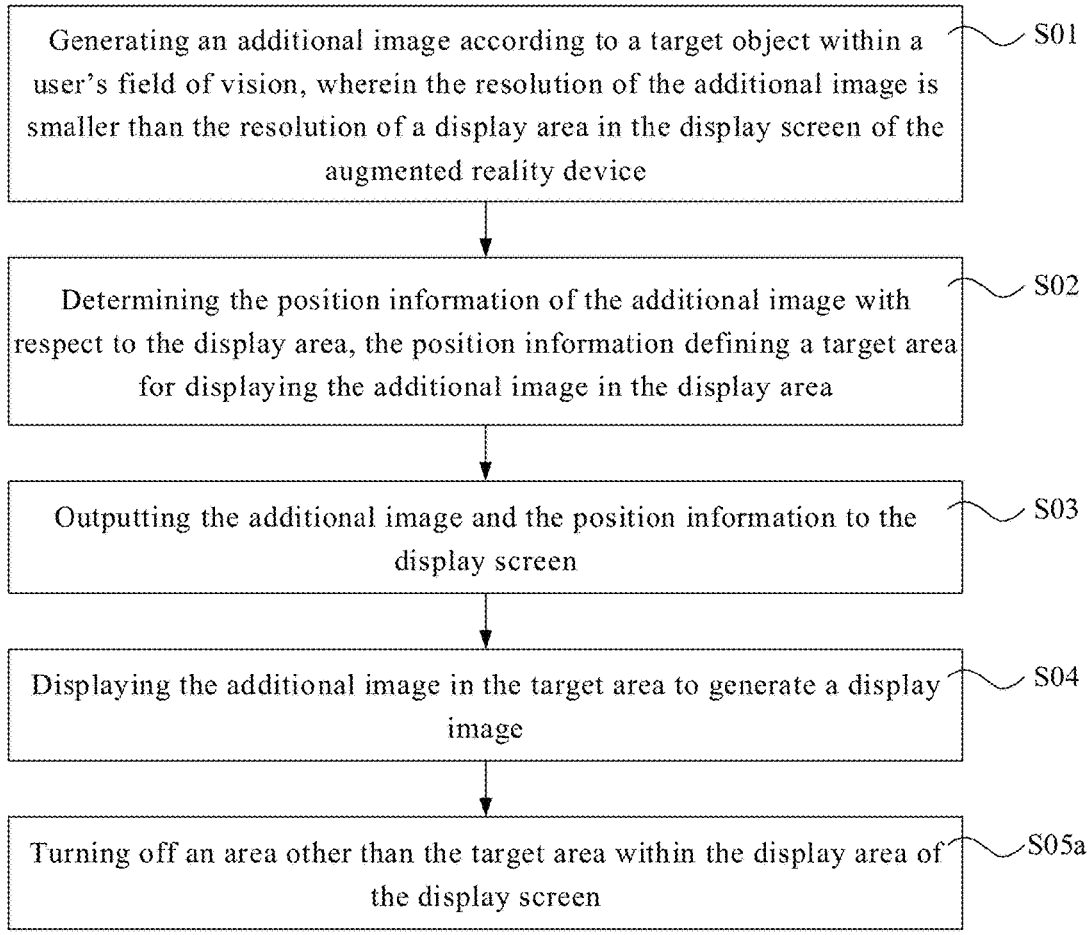
FIG. 5 is a schematic flowchart of an image processing method for an augmented reality device provided by an exemplary embodiment.

FIG. 5 is a schematic flowchart of an image processing method for an AR device provided by a further exemplary embodiment of the present disclosure. As shown in FIG. 5, the image processing method 12 only differs from the image processing method 10 as shown in FIG. 1 in that it further comprises the step S05a of turning off an area other than the target area within the display area of the display screen.

Therefore, in the image processing method 12 as shown in FIG. 5, when the display screen of the AR device displays the additional image in its target area to generate a display image, the area other than the target area within the display area of the display screen is turned off (that is, not displaying), and therefore is in the no-power state, which can significantly reduce the display power consumption.

Figure 6:
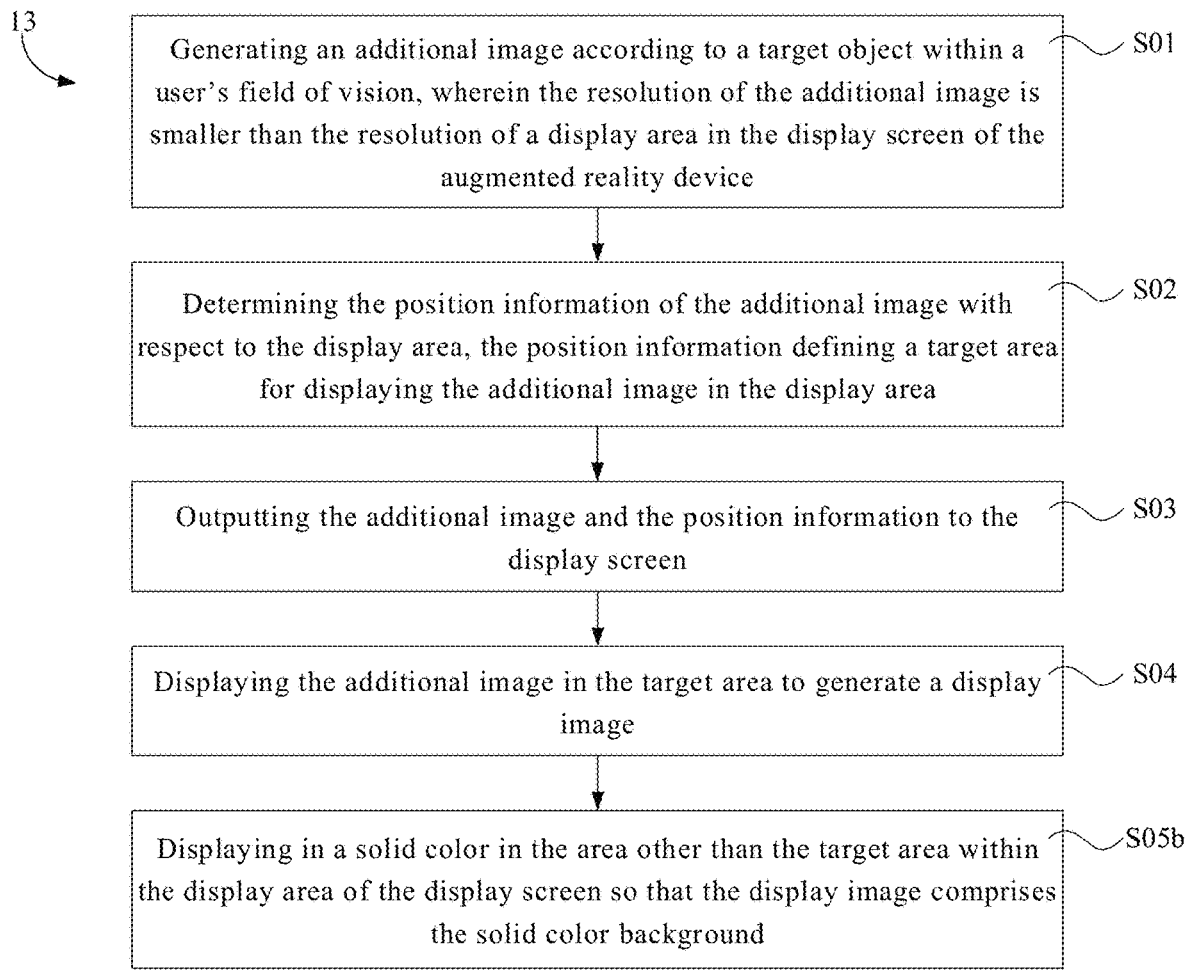
FIG. 6 is a schematic flowchart of an image processing method for an augmented reality device provided by an exemplary embodiment.

FIG. 6 is a schematic flowchart of an image processing method for an AR device provided by a yet another exemplary embodiment. As shown in FIG. 6, the image processing method 13 only differs from the image processing method 10 as shown in FIG. 1 in that it further comprises the step S05b of displaying in a solid color in the area other than the target area within the display area of the display screen so that the display image comprises the solid color background.

Therefore, in the image processing method 13 as shown in FIG. 6, other area other than the target area in the display area of the display screen will display a solid color image. For instance, a preset solid color image may be displayed fixedly under the control of the corresponding driver integrated circuit (driver IC) in the AR device or the display screen, and the solid color image be used as the background when the display image is displayed. When the display image displayed in the display area of the display screen is projected into the user's field of vision by the optical system of the AR device, in the virtual image formed by projection, the solid color background is projected into a transparent part (when the solid color background is a black background) or a partially transparent part (when the solid color background is a solid color background in other colors), so as to enable the human eye to continue to observe the real world in the field of vision.

As a non-limiting example, the additional image is displayed at a first refresh frequency in the target area of the display screen, and the preset solid color image is displayed at a second refresh frequency in other area within the display area of the display screen, wherein the second refresh frequency is less than the first refresh frequency. This is because, when the above additional image is displayed in the target area, since the additional image is associated with the target object that the user is interested in, the additional image may be refreshed at the higher first refresh frequency f1 (for example, f1≥60 Hz), so as to be updated in time; while in other area of the display area, since the solid color image does not need to be updated frequently, the area may be refreshed at the lower second refresh frequency f2 (for example, f2≤1 Hz), thereby reducing the display power consumption to a certain extent.

After the display image is generated, the image displayed in the display area of the display screen may be projected into the user's field of vision, so as to realize the visual effect that the user can sensorily see the virtual object simultaneously existing in the real environment, i.e., to realize the "augmentation" of the real scene.

As a non-limiting example, the additional image displayed in the target area may be projected into the user's field of vision to generate a virtual image; alternatively, the additional image displayed in the target area of the display area and the solid color image displayed in other areas of the display area may be both projected into the user's field of vision to respectively generate a virtual image and a transparent or partially transparent background corresponding to the solid color image.

When the solid color image is a black image, the black image displayed in the display area is projected into the user's field of vision as a transparent background after being processed by the optical system of the AR device so that human eyes can better observe the real world within the field of vision. Of course, when the solid color image is in other color, the solid color image displayed in the display area is projected into the user's field of vision as a partially transparent (i.e., not completely transparent) background after being processed by the optical system of the AR device, so that human eyes can also continue observing the real world within the field of vision.

It should be noted that relevant technologies may be adopted to project the image displayed in the display area of the display screen into the user's field of vision by the optical system in the AR device. For example, the image displayed in the display area is projected into the user's field of vision in an optical conduction manner, like by optical waveguide or prism, which will not be specially defined in the present disclosure.

In addition, in the image processing methods 10, 11, 12, and 13 as stated above, the additional image may be processed so that the virtual image formed by projecting the additional image does not overlap with the target object. As a non-limiting example, the processing method may include, but is not limited to, the following: when the target object within the user's field of vision is set by default to be within the central area of the user's field of vision, the target area for displaying the additional image in the display area may be set to be in the edge area of the display area, such as in at least one of the upper left corner, the upper right corner, the lower left corner, and the lower right corner. Thus, since the target area within the display area is used to display the additional image, the display image is also correspondingly displayed in at least one of the upper left corner, the upper right corner, the lower left corner and the lower right corner of the whole display area, so that the virtual image formed by projection is correspondingly located in at least one of the upper left corner, the upper right corner, the lower left corner and the lower right corner within the whole projection scope, so that the virtual image formed by projection will not cover the target object.

Alternatively, the position of the target area in the display area may be automatically adjusted according to the approximate form of the target object in the user's field of vision and its approximate position within the user's field of vision. For example, when the target object is the Eiffel Tower and substantially located in the central position of the user's field of vision, since the Eiffel Tower is substantially in a vertical form, the target area for displaying the additional image may be set to be located on the left-central side or right-central side of the display area, so that the virtual image formed by projecting the displayed additional image is correspondingly located on the left-central side or right-central side within the whole projection scope, rather than cover the target object. Another example is that when the target object is an airplane in the sky, since the airplane is located in the upper area within the user's field of vision, the target area for displaying the additional image may be set to be located in the center of the display area or below the center thereof, so that the virtual image formed by projecting the displayed additional image is correspondingly located in the center of the whole projection scope or below the center thereof, so that the virtual image formed by projection will not cover the target object.

Figure 7:
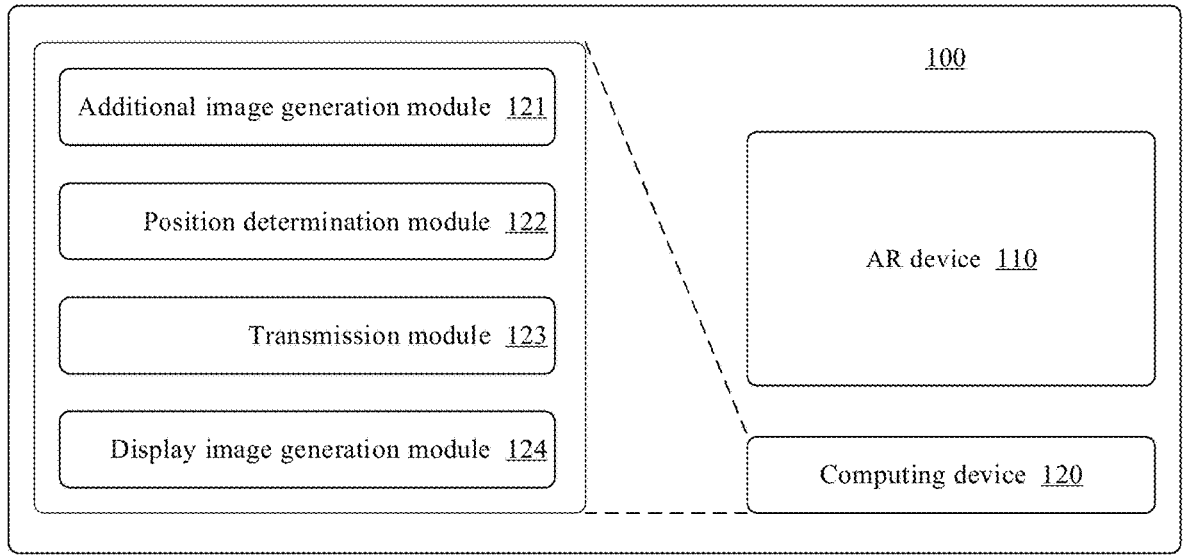
FIG. 7 is an AR system provided by an exemplary embodiment.

FIG. 7 illustrates an AR system provided by an exemplary embodiment. As shown in FIG. 7, the AR system 100 may comprise an AR device 110 and a computing device 120. The AR device 100 may be any suitable AR device known in the art, and the computing device 120 may be implemented as a program application pre-installed in the AR device 110 or downloaded via a network such as the internet. Alternatively, the computing device 120 may also be implemented as a separate device working together with the AR device 110 or a hardware assembly integrated in the AR device 110, which will not be specially defined in the present disclosure. The computing device 120 may be configured to implement the image processing methods 10, 12 and 13 as shown in FIGS. 1 and 5-6.

As shown in FIG. 7, the computing device 120 comprises: an additional image generation module 121, a position determination module 122, a transmission module 123 and a display image generation module 124. The additional image generation module 121 may be configured to generate an additional image according to a target object within the user's field of vision, wherein the resolution of the additional image is less than the resolution of a display area in the display screen of the AR device. The position determination module 122 may be configured to determine the position information of the additional image with respect to the display area, the position information used to define a target area for displaying the additional image in the display area. The transmission module 123 may be configured to output the additional image and the position information to the display screen. The display image generation module 124 may be configured to display the additional image in the target area to generate a display image. Thus, it is easily understood that the additional image generation module 121, the position determination module 122, the transmission module 123, and the display image generation module 124 in the computing device 120 may be respectively used to implement the steps S01, S02, S03, and S04 of the image processing methods 10, 12 and 13.

The additional image generation module 121 may also be configured to acquire an image of the target object, compare the image of the target object with a pre-stored feature image to identify the target object, and generate the additional image according to the result of the identification. Thus, the additional image generation module 121 may also be used to implement the steps S011, S012, and S013 as shown in FIG. 3.

In addition, the display image generation module 124 may also be configured to turn off an area other than the target area within the display area of the display screen. Thus, the display image generation module 124 may also be used to implement the step S05a of the image processing method 12.

Moreover, the display image generation module 124 may also be configured to display in a solid color in the area other than the target area within the display area of the display screen so that the display image comprises the solid color background. Thus, the display image generation module 124 may also be used to implement the step S05b of the image processing method 13. In such circumstances, the display image generation module 124 may also be configured to display the additional image at a first refresh frequency in the target area and display the solid color background at a second refresh frequency less than the first refresh frequency in the area other than the target area within the display area of the display screen. For instance, when the additional image is displayed in the target area, the additional image may be refreshed at the higher first refresh frequency f1 (for example, f1≥60 Hz), so as to be updated in time; while in other area of the display area, since the solid color image does not need to be updated frequently, the area may be refreshed at the lower second refresh frequency f2 (for example, f2≤1 Hz), thereby reducing the display power consumption to a certain extent.

Figure 8:
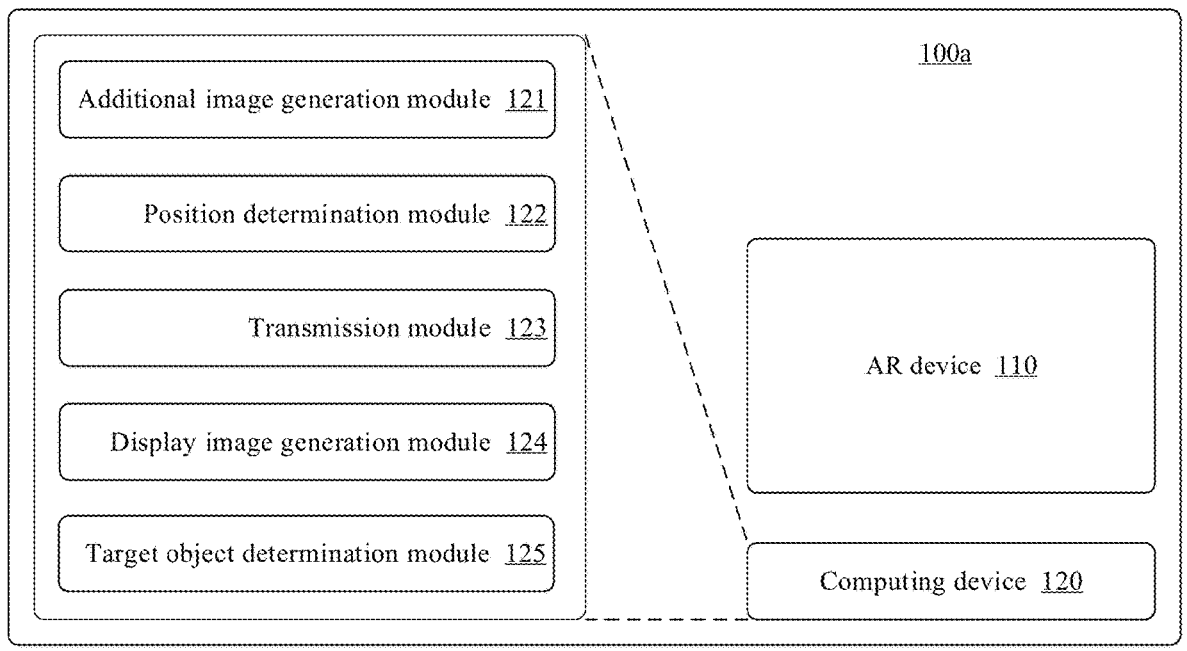
FIG. 8 is an AR system provided by another exemplary embodiment.

FIG. 8 illustrates an AR system provided by another exemplary embodiment. As shown in FIG. 8, the AR system 100a is substantially similar to the AR system 100 as shown in FIG. 7, with the only difference lying in that the computing device 120a in the AR system 100a further comprises a target object determination module 125. The target object determination module 125 may be configured to determine the target object within the user's field of vision. As a non-limiting example, the target object determination module 125 may also determine the object in the center of the user's field of vision as the target object. It can be easily understood that the target object determination module 125 may determine the target object within the user's field of vision by any other suitable method, which will not be specially defined in the present disclosure.

Figure 9:
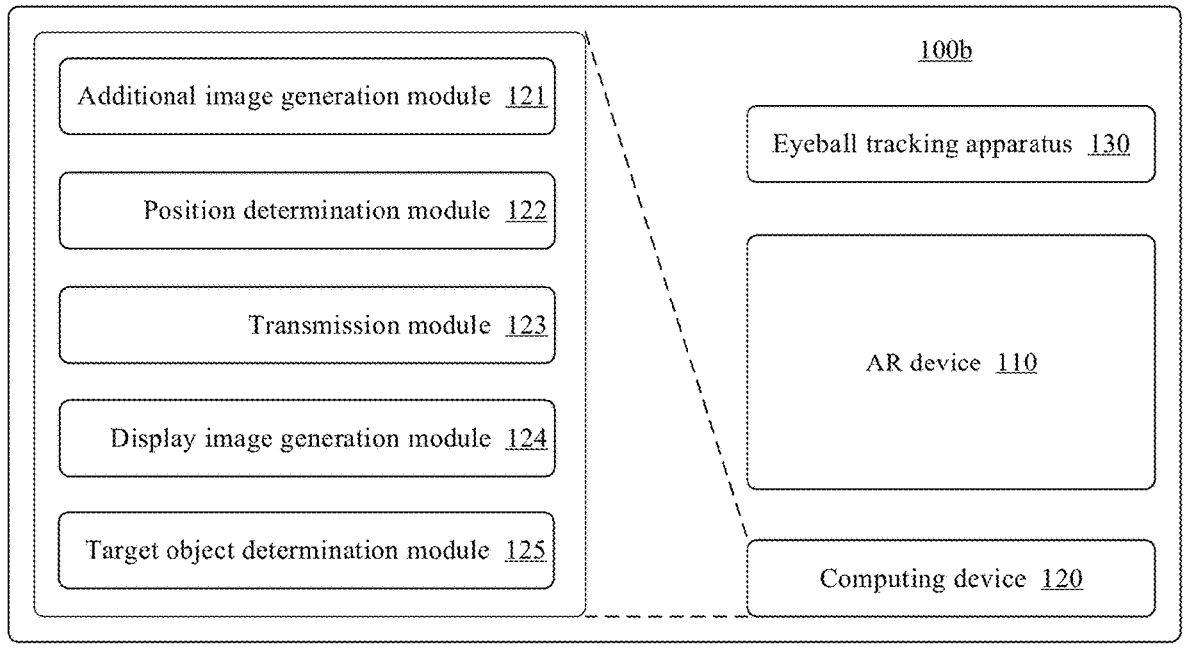
FIG. 9 is an AR system provided by an exemplary embodiment.

FIG. 9 illustrates an AR system provided by a further exemplary embodiment. As shown in FIG. 9, the AR system 100b is substantially similar to the AR system 100a shown in FIG. 8, with the only difference lying in that the AR system 100b further comprises an eyeball tracking apparatus 130. The eyeball tracking apparatus 130 may track an eyeball movement of the user directly, or may generate an eyeball movement trajectory of the user to track the eyeball movement of the user. In such circumstances, the target object determination module 125 may be configured to track the eyeball movement of the user so as to determine the target object within the user's field of vision. As a non-limiting example, the eyeball tracking apparatus may also be integrated into the AR device.

As a non-limiting example, the eyeball tracking apparatus may, e.g., be a tracker that tracks the eyeball movement according to the change in the characteristics of the eyeball and its surroundings, or a tracker that tracks the eyeball movement according to the change in the angle of an iris, or a tracker that tracks the eyeball movement by actively projecting a light beam such as an infrared ray onto the iris to extract the corresponding characteristics. The eyeball tracking apparatus is positioned on the AR device so that it can receive the changes in the characteristics of the eyeball and its surroundings, or receive the changes in the angle of an iris, or project a light beam to the iris and receive the returned light beam. The present disclosure does not specially define the specific position of the eyeball tracking apparatus.

Figure 10:
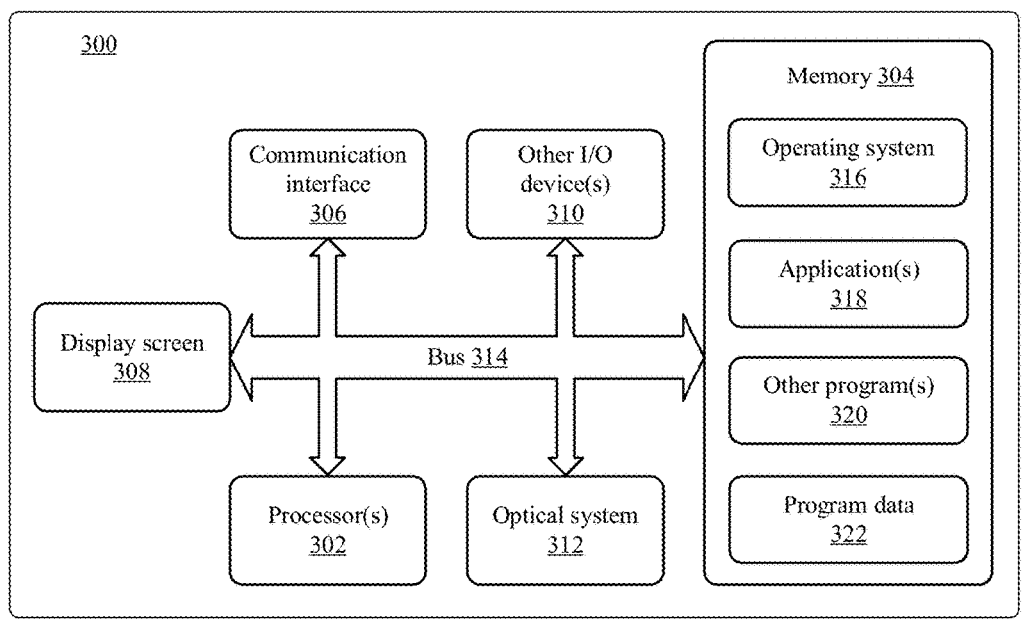
FIG. 10 is an AR device provided by an exemplary embodiment.

FIG. 10 is a schematic block diagram of an AR device 300 provided by an exemplary embodiment. As a non-limiting example, the AR device 110 shown in the FIGS. 7, 8 and 9 may be in the form of the AR device 300.

The AR device 300 may comprise at least one processor 302, a memory 304, one or more communication interfaces 306, a display screen 308, other input/output (I/O) device 310 and an optical system 312 that are in mutual communication such as via a system bus 314 or other suitable connection.

As a non-limiting example, the display screen 308 may be a liquid crystal display (LCD) screen or an organic light-emitting diode (OLED) display screen, which is used to display the additional image in the target area to generate a display image with or without a background part. The optical system 312 may, e.g., comprise optical elements such as reflective optical element(s) and imaging lens(es), so as to project the whole image displayed in the display area of the display screen 308 into the user's field of vision to thereby realize the "augmentation" of the real scene. It should be understood that the composition and imaging principle of the optical system 312 are only exemplary, and any other suitable optical system is possible as long as it can project the image displayed on the display screen 308 to the user's field of vision. In addition, the specific structure of the optical system 312 can follow the structure design within the related AR device.

The processor 302 may be a single processing unit or a plurality of processing units, and all processing units may comprise a single or a plurality of computing units or cores. The processor 302 may be implemented as one or more microprocessors, microcomputers, microcontrollers, digital signal processors, central processing units, state machines, logic circuits, and/or any device that manipulates a signal based on operating instructions. In addition to other capabilities, the processor 302 may be configured to acquire and execute computer-readable instructions stored in the memory 304 or other computer-readable medium, such as the program codes of the operating system 316, the program codes of the application(s) 318, the program codes of other program(s) 320, and may be configured to acquire program data 322 stored in the memory 304.

The memory 304 is an example of a computer storage medium for storing the instructions to be executed by the processor 302 in order to implement the various functions described above. For example, the memory 304 may generally comprise both a volatile memory and a non-volatile memory (e.g., RAM or ROM or the like). In addition, the memory 304 may also comprise a hard disk drive, a solid-state drive, a removable medium, an external and removable drive, a memory card, a flash memory, a floppy disk, an optical disk (e.g., CD or DVD), a storage array, a network attached storage, a storage area network, and the like. The memory 304 may be referred to herein as a computer storage medium, and may be a non-instantaneous medium capable of storing the computer-readable, processor-executable program instructions as the computer program codes, which may be executed by the processor 302 as a specific machine configured to perform the operations and functions described in the exemplary embodiments of the present disclosure.

A plurality of program modules may be stored in the memory 304. These program modules may comprise an operating system 316, one or more applications 318, other programs 320, and program data 322, and may be loaded into the memory 304 for execution. Examples of such applications or program modules may comprise, for example, a computer program logic (e.g., the computer program codes or instructions) for implementing the following components/functions: the additional image generation module 121, the position determination module 122, the transmission module 123 and the display image generation module 124, as well as the target object determination module 125.

Although illustrated in FIG. 10 as being stored in the memory 304 of the AR device 300, the modules 121, 122, 123, 124 and 125 or portions thereof may also be implemented using any form of the computer-readable medium accessible by the AR device 300. As used herein, "a computer-readable medium" at least comprises two types of computer-readable media, namely, a computer storage medium and a communication medium.

A computer storage medium comprises volatile and nonvolatile, removable and non-removable medium implemented by any method or technology for storing information, such as the computer-readable instructions, the data structure(s), the program module(s), or other data. The computer storage medium comprises, but is not limited to, a RAM, a ROM, an EEPROM, a flash memory or other memory technologies, a CD-ROM, a digital versatile disk (DVD), or other optical storage devices, a magnetic cartridge, a magnetic tape, a magnetic disk storage device or other magnetic storage devices, or any other non-transmission medium that may be used to store information for access by a computing device.

In contrast, the communication medium may be specifically implemented as the computer-readable instructions, the data structure(s), the program module(s) or other data in a modulated data signal, such as a carrier or other transmission mechanisms. The computer storage medium as defined in the present disclosure does not comprise a communication medium The AR device 300 may also comprise one or more communication interfaces 306 for exchanging data with other devices via, e.g., a network or direct connections, as discussed earlier. Such a communication interface may be one or more of the following: any type of network interface (e.g., a network interface card (NIC)), a wired or wireless (such as IEEE 802.11 wireless LAN (WLAN)) interface, a world interoperability for microwave access (Wi-MAX) interface, an Ethernet interface, a universal serial bus (USB) interface, a cellular network interface, a Bluetooth™ interface, a near field communication (NFC) interface, etc. The communication interface 306 may facilitate communication within a variety of networks and protocol types, including a wired (such as LAN, or cable) network and a wireless (such as WLAN, cellular, or satellite) network, the Internet, and the like. The communication interface 306 may also provide communication with an external storage device (not shown), such as a storage array, a network attached storage, or a storage area network.

Other I/O device 310 in the AR device 300 may be a device that receives various inputs from a user and provide various outputs to the user, and may comprise a touch input device, a gesture input device, a shooting device, a keyboard, a remote control, a mouse, a printer, an audio input/output device, and the like.

As a non-limiting example, the AR device 300 may be implemented as AR glasses. The AR glasses may comprise, for example, a glasses body (including components such as lens(es) and a glasses holder), an eyeball tracking apparatus and a camera serving as the I/O device(s), a processor, a micro LCD display screen serving as a display screen, and an assembly such as an optical system including reflective optical element(s) and imaging lens(es). As a non-limiting example, the processor may be arranged on the glasses holder and coupled with the eyeball tracking apparatus, the camera, and the micro LCD display screen in a wired and/or a wireless manner(s).

As stated above, the eyeball tracking apparatus may, e.g., be a tracker that tracks the eyeball movement according to the changes in the characteristics of the eyeball and its surroundings, or a tracker that tracks the eyeball movement according to the changes in the angle of an iris, or a tracker that tracks the eyeball movement by actively projecting a light beam such as an infrared ray onto the iris to extract the corresponding characteristics. The eyeball tracking apparatus is positioned on the glasses body in such a way that it can receive the changes in the characteristics of the eyeball and its surroundings, or receive the changes in the angle of an iris, or project a light beam to the iris and receive the returned light beam. The present disclosure does not specially define the specific position of the eyeball tracking apparatus, and the structure design of relevant AR glasses may be followed.

In addition, the camera, the micro LCD display screen and the optical system may be set on the side of the lens frame of the glasses holder far away from the eyeball, so as to shoot the target object and project the target sub-image of interest displayed on the micro LCD display screen to the user's field of vision through the optical system, thereby realizing the visual effect that the user sensorily sees the virtual object simultaneously existing in the real environment, i.e., realizing the "augmentation" of the real scene.

Figure 11:
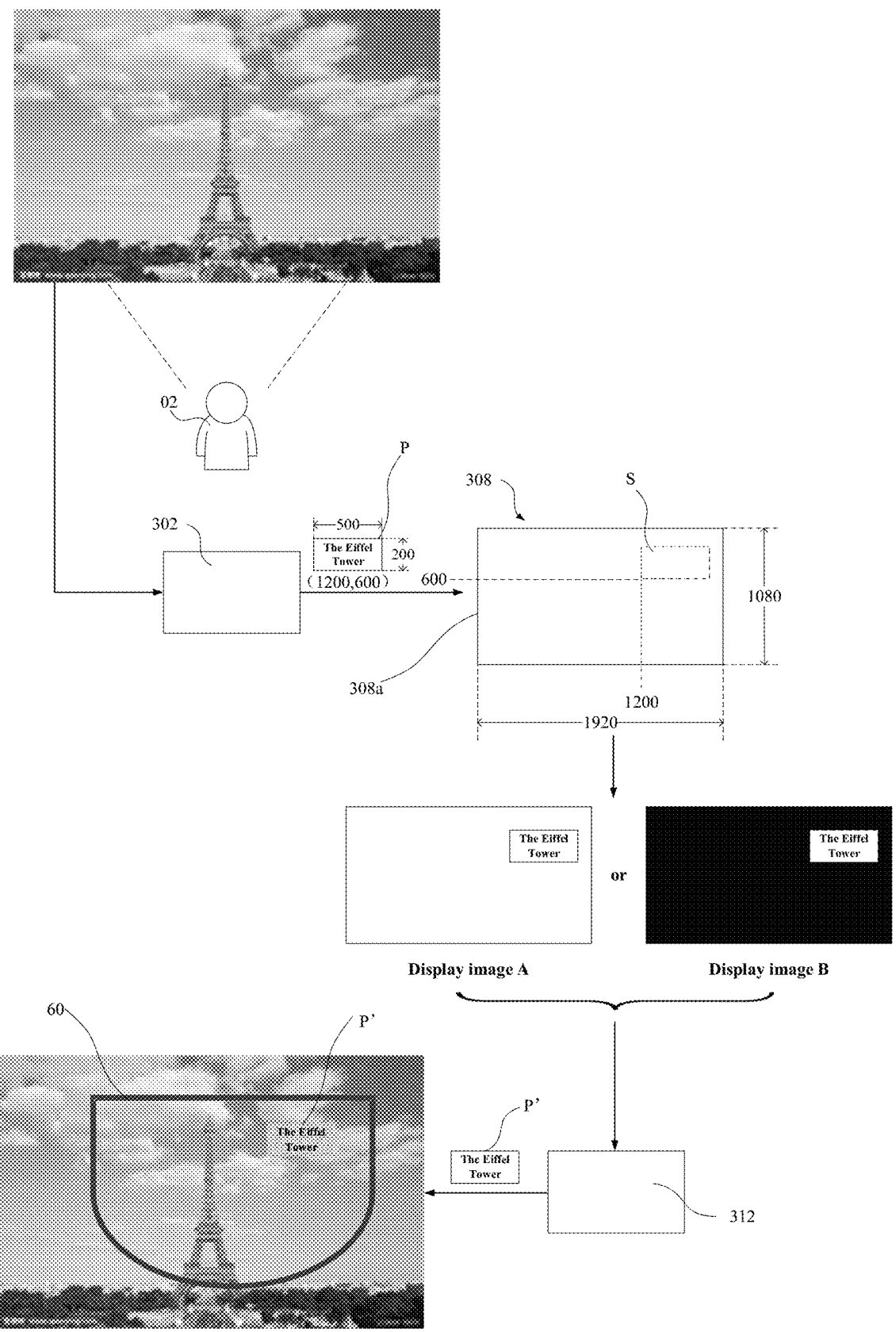
FIG. 11 schematically shows a process for implementing an AR display, which utilizes the image processing methods and the AR devices provided by the exemplary embodiments.

FIG. 11 schematically shows a process for implementing AR display, which may utilize the AR device 300 as shown in FIG. 10 and the image processing method 10, 11, 12 and 13 as shown in FIGS. 1, 4, 5 and 6. And as a non-limiting example, in the implementing process as shown in FIG. 11, the AR device 300 may be implemented as a pair of AR glasses.

As shown in FIG. 11, when the processor 302 identifies that the target object (i.e. the object of concern) within the field of vision of the user 02 is the Eiffel Tower, the processor 302 generates an additional image P with a resolution of 500×200 pixels. For example, the content of the additional image P may be words used to explain and describe the target object (i.e. the Eiffel Tower). In FIG. 11, the content of the additional image P is the three words "The Eiffel Tower."

As a non-limiting example, the resolution of the display area 308a of the display screen 308 may be 1920×1080 pixels. Based on the resolution of the display area 308a of the display screen 308 and in conjunction with the approximate position of the target object in the field of vision of the user 02, the processor 302 may determine the position information of the additional image P with respect to the display area 308a of the display screen 308. For example, the position information may comprise: the coordinates of the point at the lower left corner of the additional image P, as a reference point, in the display area 308a are (1200, 600), and the rotation angle of the additional image P with respect to the display area 308a is 0°. As shown in FIG. 11, based on the position information and in conjunction with the resolution of the additional image P itself, the target area S of the display area 308a for displaying the additional image P may be defined.

The processor 302 only needs to transmit the image information and position information of the additional image P, that is, the image with a resolution of 500×200 pixels, the reference point coordinates (1200, 600) and the rotation angle, to the display screen 308, so that the display screen 308 defines the target area S and displays the additional image P in the display area 308a, without transmitting the whole image with a resolution of 1920×1080 pixels, thereby significantly reducing the transmission bandwidth demand, lowering the power consumption and meanwhile carrying out intelligent display according to an object that a user is interested in.

When displaying, the display screen 308 displays the additional image P in the target area S of the display area 308a. The position of the target area S in the display region 308a may be determined by the position information and in conjunction with the resolution of the additional image P itself. As a non-limiting example, when the resolution of the additional image P is 500×200 pixels, the target area S has a size of 500×200 pixels, the starting coordinates of (1200, 600), and the rotation angle of 0° with respect to the display area 308a.

As shown in FIG. 11, in some exemplary embodiments, the area other than the target area S in the display area 308a of the display screen 308 is turned off, so that no image (as shown in the display image A in FIG. 11) is displayed there, i.e., in the off state (i.e., not displaying), thereby significantly reducing the display power consumption. In other exemplary embodiments, the area other than the target area S in the display area 308a of the display screen 308 may display a solid color image, such as a black image shown in FIG. 11, in order to supplementarily display the scanned content (such as the display image B as shown in FIG. 11). In such circumstances, the additional image may be displayed at the first refresh frequency f1 in the target area S, while the solid color image may be displayed at the second refresh frequency f2 in the rest area of the display area 308a, and the second refresh frequency f2 is less than the first refresh frequency f1. As a non-limiting example, the first refresh frequency f1 may be greater than or equal to 60 Hz, and the second refresh frequency f2 may be less than or equal to 1 Hz, thereby reducing the display power consumption to a certain extent.

Further referring to FIG. 11, the display image (i.e., the display image A without the background part or the display image B with the background part) displayed in the display area 308a of the display screen 308 is wholly projected to the field of vision of the user 02 through the optical system 312 to generate a virtual image P', so that the user 02 can see the visual effect of the virtual image P' simultaneously existing in the real environment through the lens (since the lens is transparent, FIG. 11 does not show the lens, but only the lens frame 60 for fixing the lens(es)), thereby realizing the "augmentation" of the real scene.

It can be seen that, with the AR device provided by the exemplary embodiments of the present disclosure and the image processing methods therefor, it is only necessary to process the image information and position information of the additional image associated with the target object that the user is interested in, and further transmit only the image information and position information of the processed additional image to the display screen, so as to intelligently display the content of interest, thereby greatly reducing the data processing amount and data transmission amount, and significantly lowering the transmission bandwidth demand and display power consumption.

In addition, since the image processing methods provided by the exemplary embodiments of the present disclosure may reduce the transmission bandwidth demand of the processor and the display power consumption of the entire AR system or device, the AR system or device using the image processing method as described above is more suitable for high-end display application with ultra-high PPI and/or large FOV.

The above contents are only exemplary embodiments and the scope of the present disclosure is not limited thereto. Any person skilled in the art can readily conceive of various variations or replacements within the technical scope disclosed by the present disclosure. These variations or replacements all fall within the scope of protection of the present disclosure. Thus, the scope of protection of the present disclosure is determined based upon the scopes of the appended claims.

What is claimed is:

1. An image processing method for an augmented reality device, which comprises the steps of:
    generating an additional image according to a target object within a user's field of vision, wherein the additional image is viewable for the user and the resolution of the additional image is smaller than the resolution of a display area in the display screen of the augmented reality device;
    determining position information of the additional image with respect to the display area, the position information defining a target area for displaying the additional image in the display area, wherein the position information comprises coordinates of a reference point in the additional image in the display area and a rotation angle of the additional image with respect to the display area;
    outputting the additional image and the position information to the display screen; and
    displaying the additional image in the target area to generate a display image,
    wherein the position of the target area in the display area is automatically adjusted according to the approximate form of the target object in the user's field of vision and its approximate position within the user's field of vision.

2. The image processing method according to claim 1, wherein the step of generating an additional image according to a target object within a user's field of vision comprises:
    acquiring an image of the target object;
    comparing the image of the target object with a pre-stored feature image to identify the target object; and
    generating the additional image according to the result of the identification.

3. The image processing method according to claim 1, further comprising a step of:

determining the target object within the user's field of vision.

4. The image processing method according to claim 3, wherein the step of determining the target object within the user's field of vision comprises:
tracking an eyeball movement of the user to determine the target object.

5. The image processing method according to claim 1, further comprising a step of:
turning off an area other than the target area within the display area of the display screen.

6. The image processing method according to claim 1, further comprising a step of:
displaying in a solid color in the area other than the target area within the display area of the display screen so that the display image comprises a background in the solid color.

7. The image processing method according to claim 6, wherein the additional image is displayed at a first refresh frequency in the target area, and the background in the solid color is displayed at a second refresh frequency less than the first refresh frequency in the area other than the target area within the display area of the display screen.

8. The image processing method according to claim 7, wherein the first refresh frequency is greater than or equal to 60 Hz, and the second refresh frequency is less than or equal to 1 Hz.

9. A computing device for an augmented reality device, comprising:
an additional image generation module configured to generate an additional image according to a target object within a user's field of vision, wherein the additional image is viewable for the user and the resolution of the additional image is smaller than the resolution of a display area in the display screen of the augmented reality device;
a position determination module configured to determine position information of the additional image with respect to the display area, the position information defining a target area for displaying the additional image in the display area, wherein the position information comprises coordinates of a reference point in the additional image in the display area and a rotation angle of the additional image with respect to the display area;
a transmission module configured to output the additional image and the position information to the display screen; and
a display image generation module configured to display the additional image in the target area to generate a display image,
wherein the position of the target area in the display area is automatically adjusted according to the approximate form of the target object in the user's field of vision and its approximate position within the user's field of vision.

10. The computing device according to claim 9, wherein the additional image generation module is configured to:
acquire an image of the target object;
compare the image of the target object with a pre-stored feature image to identify the target object; and
generate the additional image according to the result of the identification.

11. The computing device according to claim 9, further comprising:
a target object determination module configured to determine the target object within the user's field of vision.

12. The computing device according to claim 11, wherein the target object determination module is further configured to:
track an eyeball movement of the user to determine the target object.

13. The computing device according to claim 9, wherein the display image generation module is further configured to:
turn off an area other than the target area within the display area of the display screen.

14. The computing device according to claim 9, wherein the display image generation module is further configured to:
display in a solid color in the area other than the target area within the display area of the display screen so that the display image comprises a background in the solid color.

15. The computing device according to claim 14, wherein the display image generation module is further configured to:
display the additional image at a first refresh frequency in the target area, and display the background in the solid color at a second refresh frequency less than the first refresh frequency in the area other than the target area within the display area of the display screen.

16. An augmented reality system, comprising:
an augmented reality device; and
a computing device according to claim 9.

17. The augmented reality system according to claim 16, wherein the computing device further comprises a target object determination module configured to determine the target object within the user's field of vision.

18. An augmented reality device, comprising:
a memory configured to store a computer program; and
a processor configured to execute the computer program to implement the image processing method according to claim 1.

19. The augmented reality device according to claim 18, wherein the augmented reality device is augmented reality glasses.

20. A non-transitory computer-readable storage medium in which a computer program is stored, wherein when executed, the computer program implements the image processing method according to claim 1.

* * * * *

UNITED STATES PATENT AND TRADEMARK OFFICE
CERTIFICATE OF CORRECTION

PATENT NO. : 11,232,602 B2  
APPLICATION NO. : 16/745412  
DATED : January 25, 2022  
INVENTOR(S) : Lili Chen et al.

Page 1 of 1

It is certified that error appears in the above-identified patent and that said Letters Patent is hereby corrected as shown below:

On the Title Page

Please correct the second Assignee in item (73) to read as follows:  
---BOE TECHNOLOGY GROUP CO., LTD., Beijing (CN)---

Signed and Sealed this  
Twenty-ninth Day of November, 2022

Katherine Kelly Vidal  
*Director of the United States Patent and Trademark Office*